United States Patent [19]

Nakagawa

[11] Patent Number: 5,701,434
[45] Date of Patent: Dec. 23, 1997

[54] INTERLEAVE MEMORY CONTROLLER WITH A COMMON ACCESS QUEUE

[75] Inventor: Takayuki Nakagawa, Hadano, Japan

[73] Assignee: Hitachi, Ltd., Tokyo, Japan

[21] Appl. No.: 405,190

[22] Filed: Mar. 16, 1995

[51] Int. Cl.⁶ .................................................. G06F 13/00
[52] U.S. Cl. ........................ 395/484; 395/405; 395/465
[58] Field of Search ................................. 395/858, 859, 395/405, 484, 401–403, 431, 432, 438, 454, 478, 481, 485, 494–496, 465

[56] References Cited

U.S. PATENT DOCUMENTS

| | | | |
|---|---|---|---|
| 3,449,723 | 6/1969 | Anderson et al. | 340/172.5 |
| 3,699,530 | 10/1972 | Capowski et al. | 395/859 |
| 4,293,910 | 10/1981 | Flusche et al. | 395/484 |
| 4,558,429 | 12/1985 | Barlow et al. | 395/484 |
| 4,574,350 | 3/1986 | Starr | 395/478 |
| 4,654,778 | 3/1987 | Chiesa et al. | 395/478 |
| 4,843,543 | 6/1989 | Isobe | 395/475 |
| 4,888,691 | 12/1989 | George et al. | 364/300 |
| 5,016,167 | 5/1991 | Nguyen et al. | 395/478 |
| 5,088,053 | 2/1992 | Sprague et al. | 395/166 |
| 5,323,489 | 6/1994 | Bird | 395/494 |
| 5,379,379 | 1/1995 | Becker et al. | 395/250 |
| 5,432,920 | 7/1995 | Yazawa et al. | 395/292 |
| 5,448,702 | 9/1995 | Garcia, Jr. et al. | 395/286 |
| 5,450,564 | 9/1995 | Hassler et al. | 395/485 |

FOREIGN PATENT DOCUMENTS 62-251956  11/1987  Japan.

*Primary Examiner*—Meng-Ai T. An
*Attorney, Agent, or Firm*—Fay,Sharpe,Beall,Fagan,Minnich & McKee

[57] ABSTRACT

A computer system is composed of a processor 10, a memory control circuit 70, and interleaved bank memories 41 through 44. The memory control circuit contains random access queue entries 71 through 73 commonly used by all memories 41 through 44. A bypass 80 allows direct bank access without writing memory access requests to the queue entries 71 through 73. Sequence is maintained by the in-bank access sequence assurance circuits 90. Because the queue entries 71 through 73 allow memory control without providing the number of entries in an integral multiple of the number of banks, the entire circuit scale is reduced. All bank busy circuits in the system are integrated on a single LSI to reduce delay, thereby enhancing processing speed. The bypass 80 eliminates queue read/write cycles from data access time, thereby enhancing processing speed.

28 Claims, 6 Drawing Sheets

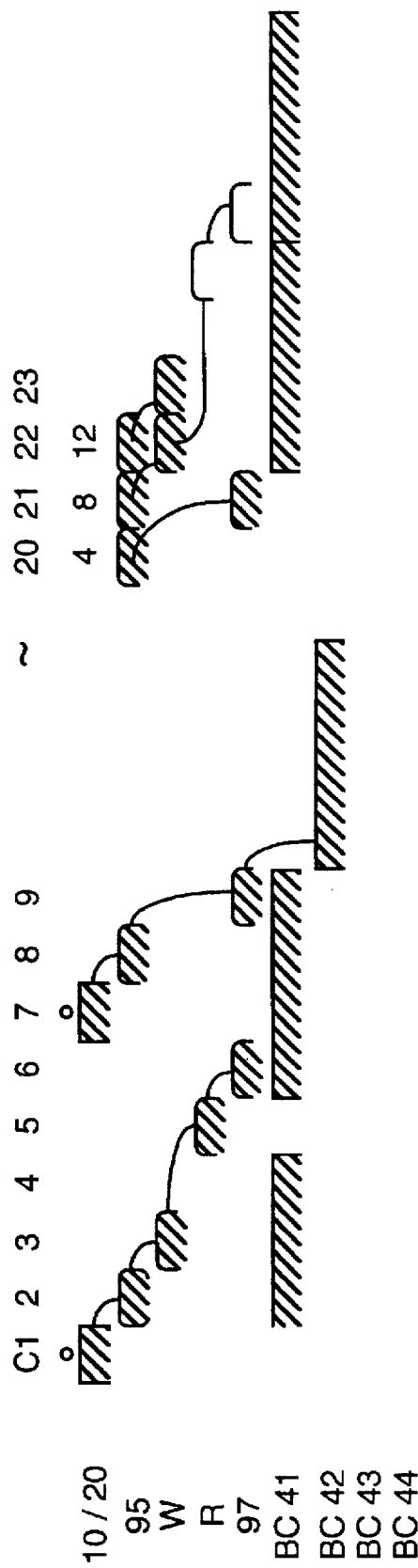

1

INTERLEAVE MEMORY CONTROLLER WITH A COMMON ACCESS QUEUE

BACKGROUND OF THE INVENTION

The present invention relates to a memory control circuit for controlling a memory access request in a computer system having an interleaved memory.

Controlling of an interleaved memory used in a computer system is disclosed in Japanese Non-examined Patent Publication No. 62-251956, entitled "Memory Control Method", which corresponds to U.S. Pat. No. 4,843,543, issued Jun. 27, 1989, wherein the interleaved memory is composed of a plurality of banks and pipeline control is applied for efficient memory access.

SUMMARY OF THE INVENTION

It is an object of the present invention to analyze and improve upon the prior art.

In the above-mentioned publication, emphasis is on the simplicity in design of an access control circuit and no consideration is paid to increased access speed to be realized by enhanced memory integration. For a control method with an interleaved memory constituted by a CMOS LSI, it takes a relatively long time from issuance of a memory read request to getting read data (turnaround time).

The reason for the above-mentioned problem is as follows. A DRAM memory circuit is intended to achieve a relatively high integration rather than a shortened cycle time required for a memory access interval. To achieve a relatively high throughput, an interleaved memory composed of a plurality of banks is required. However, as the number of banks increases, a memory control circuit for controlling the banks cannot be accommodated in a single LSI, thereby requiring bank control extending over a plurality of LSIs. Consequently, a delay is caused by an LSI input/output circuit and substrate wiring, thereby making a turnaround time relatively long. A CMOS LSI is of higher integration than an ECL LSI, but lower in driving capacity. As a result, the CMOS LSI has a relatively large delay time caused by parasitic capacitance and direct-current resistance. Memory control by a plurality of CMOS LSIs consequently makes a turnaround time relatively long. Moreover, in the above-mentioned publication, a request is written to a queue and is read from the queue even when a requested bank is unused, which simplifies memory access sequence assurance, making the turnaround time still longer.

The memory access sequence assurance determines that read and write operations are processed in the order they were instructed. Generally, the conventional access sequence assurance uses a FIFO (First In, First Out) queue.

However, in the conventional technique, a separate queue corresponding to each bank is provided to prevent a delay in accessing an unused bank and the number of entries for each queue is about four times as many as the number of banks, so that, as a memory system becomes higher in throughput, a queue circuit scale becomes greater, thereby making a memory access turnaround time relatively longer. In addition, a queue write operation itself makes the memory access turnaround time still longer.

It is therefore an object of the present invention to provide a high-speed interleaved memory control that restricts the increase in the queue circuit scale and restricts the increase in the turnaround time caused by the queue write operation in a computer system based on CMOS LSI.

In carrying out the invention with a computer system based on an interleaved memory composed of a plurality of

2 banks, a single random access queue common to all banks provides memory access request storing and is put in a wait state by a bank busy indication. The single random access queue eliminates the necessity for providing, for each bank, dedicated entries in an integral multiple of the number of banks, thereby reducing the scale of a random access queue as compared with the scale of a conventional access queue for each bank. The access sequence assurance circuit reads access requests from the random access queue and keeps the access sequence separately for each bank. When a detecting circuit detects that a requested bank for a memory access request is unused and when a detecting circuit detects that the random access queue contains no other access request for the requested bank, then a bypass control sends the memory access request to the requested bank without passing the memory access request through the access queue, to shorten a turnaround time from issuance of a memory access request to acquisition of memory read data. The bypass eliminates two processing cycles, that is, writing the memory access request to the access queue (write-to-queue) and reading the memory access request from the access queue (read-from-queue), thereby enhancing data processing speed.

BRIEF DESCRIPTION OF THE DRAWINGS

Further objects, features and advantages of the present invention will become more clear from the following detailed description of a preferred embodiment, described with respect to the accompanying drawing, wherein:

FIG. 7 is a synchronized timing chart for explaining timing of the bypass control of the memory control circuit of FIG. 3; and FIG. 7 is a synchronized timing chart for explaining timing of the control other than bypass control for the memory control circuit according to FIG. 3.

DETAILED DESCRIPTION OF A PREFERRED EMBODIMENT

Analysis

Figure 2:
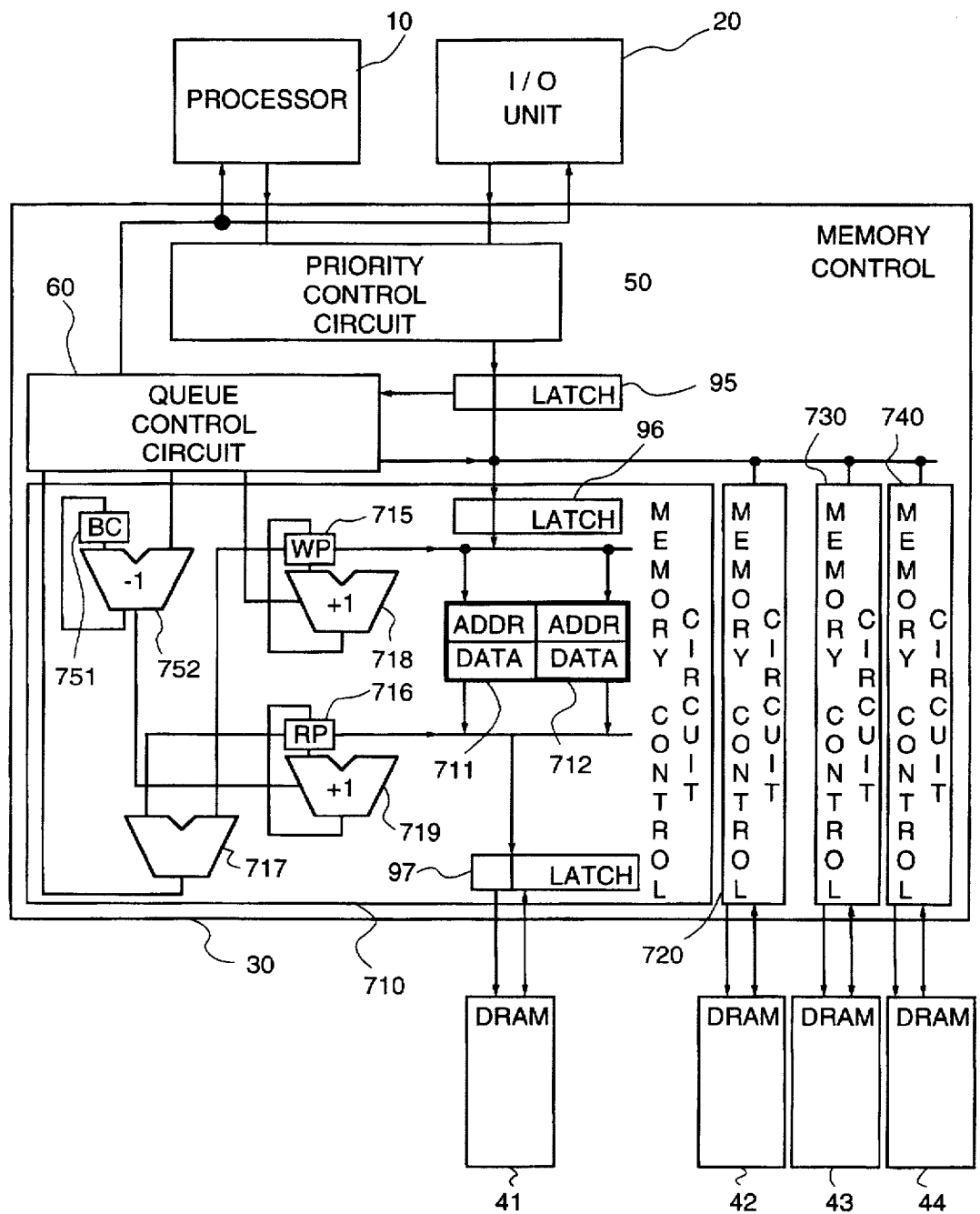
FIG. 2 is a block diagram useful in illustrating the inventor's analysis of a known memory control circuit.
Figure 5:
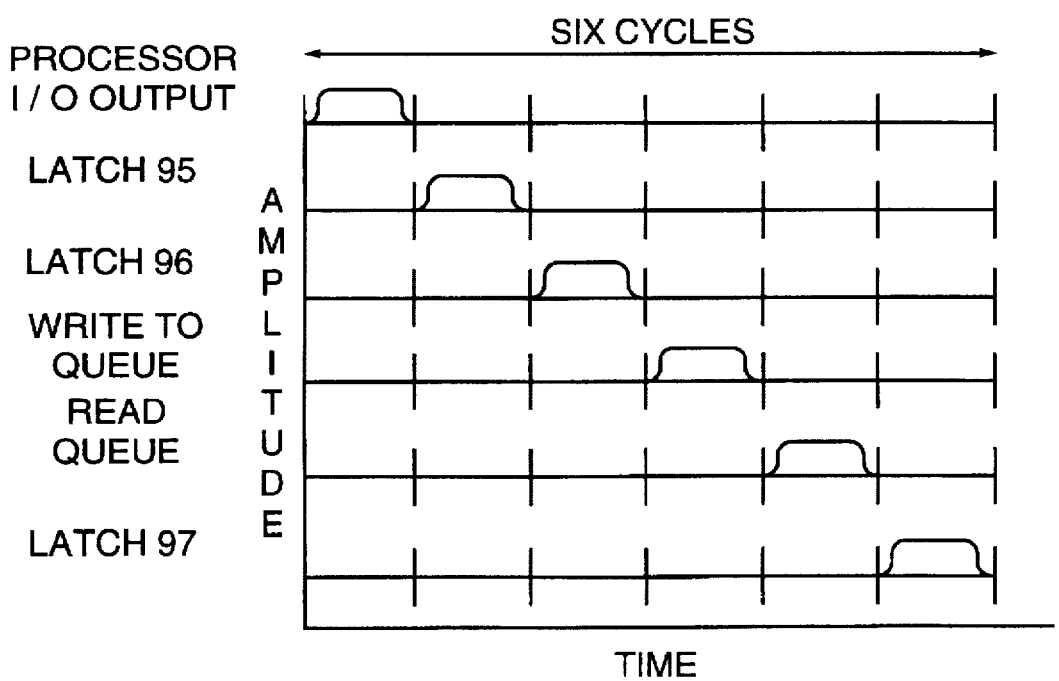
FIG. 5 is a synchronized timing chart for explaining timing of the memory control system of FIG. 2.

Referring to FIGS. 2 and 5, a memory access control circuit 30 will be analyzed. Memory access requests from a processor 10 and an input/output unit 20 are arranged into successive units of one memory access request per one cycle by a request priority control circuit 50 and then sent to a latch group 95. Then, a request queue control circuit 60 checks whether four dedicated queues respectively for the four banks 41–44 are busy or not. Each memory access request is sent to one of four memory control circuits 710, 720, 730, 740, corresponding to a requested bank of the four banks 41–44, according to the requested bank being identified by two bits of an address attached to the memory access request; for example the bank address bits may be 00 for bank 41, 01 for bank 42, 10 for bank 43 and 11 for bank 44. The memory control circuits 710, 720, 730, 740 are identical. The memory control circuit 710 will be shown and described in detail by way of example.

(1) It is supposed that a memory read access request to bank address 00 is received in latch 95. Whether any of queue entries 711, 712 of the bank 41 of address 00 is empty is detected by a comparator (ALU) 717 having inputs of a write pointer (WP) 715 and a read pointer (RP) 716. If any of the queue entries 711, 712 is found to be empty, the memory access request is written to a queue entry indicated by the write pointer 715. For example, if the write pointer 715 and the read pointer 716 have values that are both 0s, the memory access request is written to the entry 711 and an adder 718 sets 1 to the write pointer 715 (write-to-queue control).

(2) If the bank 41 is currently unused, the request queue control circuit 60 performs read-from-queue control in a cycle following the write-to-queue cycle. The request queue control circuit 60 sets a bank busy cycle count to a busy counter (BC) 751 (a register) and subtracts 1 from the busy counter 751 by means of a subtracter ALU 752. On the other hand, the request queue control circuit 60 reads the queue entry 711 indicated by the read pointer 716 to issue a read memory access request to the latch 97 (read-from-queue control). At this time, the write pointer 715 and the read pointer 716 both have values of 1. This match of values (1,1) for the read pointer 716 and write pointer 715 is determined by the comparator ALU 717 which outputs to the queue control circuit 60 a signal indicating that the queue entry 711 has been emptied. The bank busy cycle count is predetermined as an initial cycle time unique to a RAM used for the memory and the design of the computer system, and it may be equal to the memory access interval, e.g. 4 machine cycles. By detecting when the busy counter 751 has reached 0 (by decrementing the initial value of the bank busy cycle count through the subtracter ALU 752 once for each machine cycle), elapsing of a bank busy period can be known by the queue control circuit 60, which indicates that the bank is no longer busy. This in turn determines a next operation timing for the memory bank 41.

(3) The request queue control circuit 60 detects whether the bank 41 is in use or not by the busy counter 751, which issues a carry signal of the subtracter ALU 752 when the bank 41 is not in use; the request queue control circuit 60 in response to the carry signal performs read-from-queue control. That is, the request queue control circuit 60 reads the queue entry 711 indicated by the read pointer 716 and issues the read memory access request to the bank 41 through latch 97. At this point, in the read-from-queue control, the write pointer 715 and the read pointer 716 both point at 0, and the match 0,0 is detected by comparator 717 indicating that the queue entry 712 has been emptied.

(4) Then, it is supposed that read memory access requests have been consecutively issued to latch 95 for address 4, address 8 and address 12, all of a requested bank 41, after the bank 41 was put in an unused state. Since there are two queue entries (buffers) 711 and 712, the write pointer 715 is incremented by 1 by ALU 718 every time a write-to-queue operation is made, thus the one bit value of the write pointer 715 changes from 1 to 0 to 1 to 0, etc. at the times that successive memory access requests to bank 41 undergo write-to-queue controls. Meanwhile, the read pointer 716 shifts from 1 to 0 and issues one memory access request to latch 97 for address 4. At this time, the busy counter 751 is reset to the initial value (other than 0), so that the read memory access request to address 8 and the read memory access request to address 12 are not read from the queue entries 711, 712, but are held therein respectively. The comparator 717, having detected that there is no empty queue entry because of no match between the values 0, 1 of the write pointer 715 and the read pointer 716, notifies the request queue control circuit 60 accordingly.

(5) If all of the queue entries 711, 712 are found to be full, the request queue control circuit 60 issues an access request suppression signal to the processor 10 and the input/output unit 20, instructing them not to issue a memory access request. A memory access request that has been issued (by processor 10 or I/O unit 20) just before the issuance of the access request suppression signal is put in a wait state by being held in latch 95. When any of the queue entries 711 and 712 is emptied or the memory access request is addressed to a bank 42, 43, 44 other than the bank 41, the request queue control circuit 60 removes the access request suppression signal for a minimum of one cycle, thereby accepting one next memory access request.

(6) If any of the queue entries 711 and 712 of a requested bank is emptied, processing of the memory access request in latch 95 that requests the bank is in one-cycle intervals as in FIG. 5.

(7) If a memory access request is to a bank 42, 43, 44 other than the bank 41 when neither the queue entry 711 nor the queue 712 of bank 41 is empty, the request queue control circuit 60 issues the access request suppression signal while confirming the address held in latch 95. Consequently, with the conventional construction in which latch 95 can hold only one access request, the processing interval extends over two or more cycles. From an output operation of the processor 10 to an output operation of the latch 97 to bank 41, a minimum of six machine cycles are required as shown in FIG. 5.

The queue entries 711 and 712, the write pointer 715, the read pointer 716 and the comparator ALU 717 for comparing signals coming from the read pointer 716 and write pointer 715 are provided in each circuit 710, 720, 730, 740, respectively for each bank, thereby making the entire memory control 30 relatively large in size. Therefore, as the number of banks 41, 42, 43, 44 increases, it is more difficult to accommodate the memory control 30 on a single LSI chip. If the memory control 30 is in two or more LSIs, inter-LSI control is required while incrementing the pointers for comparison of the pointer values and generating the access request suppress signal by the request queue control circuit 60. This increases machine cycle time.

A technique for mitigating the increase in the machine cycle time is to provide a copy of the values of the read pointer and write pointer in the request queue control circuit 60. However, if the memory control circuits 710, 720, 730, and 740 are four LSIs, provision of such a copy requires a wiring length between the queue control circuit 60 and these bank LSIs, which wiring length is four or more times as long as a wiring length when the queue control circuit 60 is in a single LSI. Additionally, if there are two or more memory control circuit LSIs, there are input/output gates between the memory control circuit LSIs for passing signals, thereby requiring a relay latch corresponding to an output of the latch 95, resulting in a relatively long turnaround time for read data.

EMBODIMENT

Figure 3:
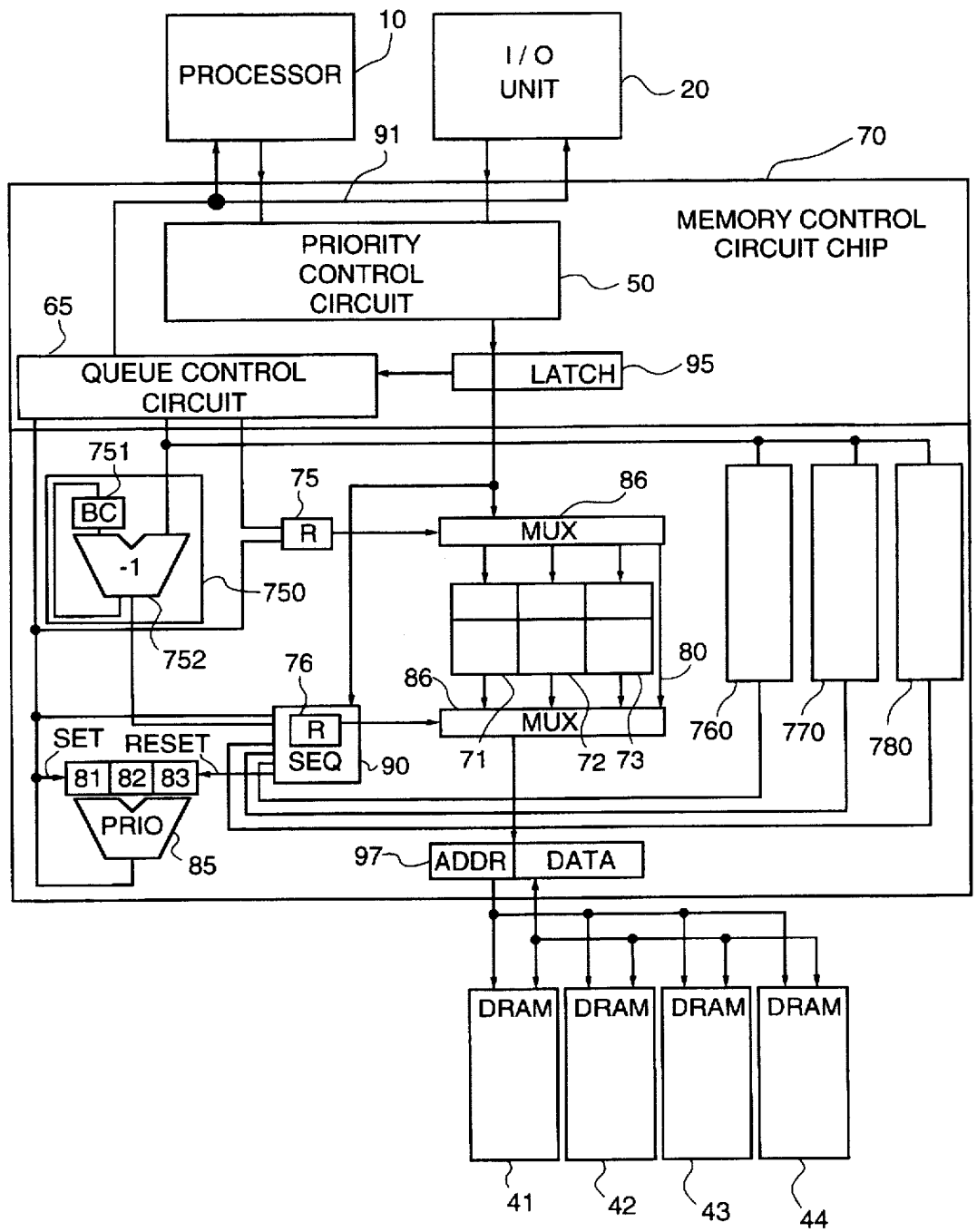
FIG. 3 is a block diagram illustrating in detail the memory control circuit of FIG. 1.

Elements having the same numerals as in FIGS. 2 and 3 are the same, with operation previously described. Therefore, such description will not be repeated. Lines shown in the drawing between blocks and other components are buses, which carry one or more of control, address and data signals as required. Other components and buses conventionally used between bank memory 41–44 and data handlers 10, 20, not directly related to the novel aspects of the present invention are not shown, to be concise.

Figure 1:
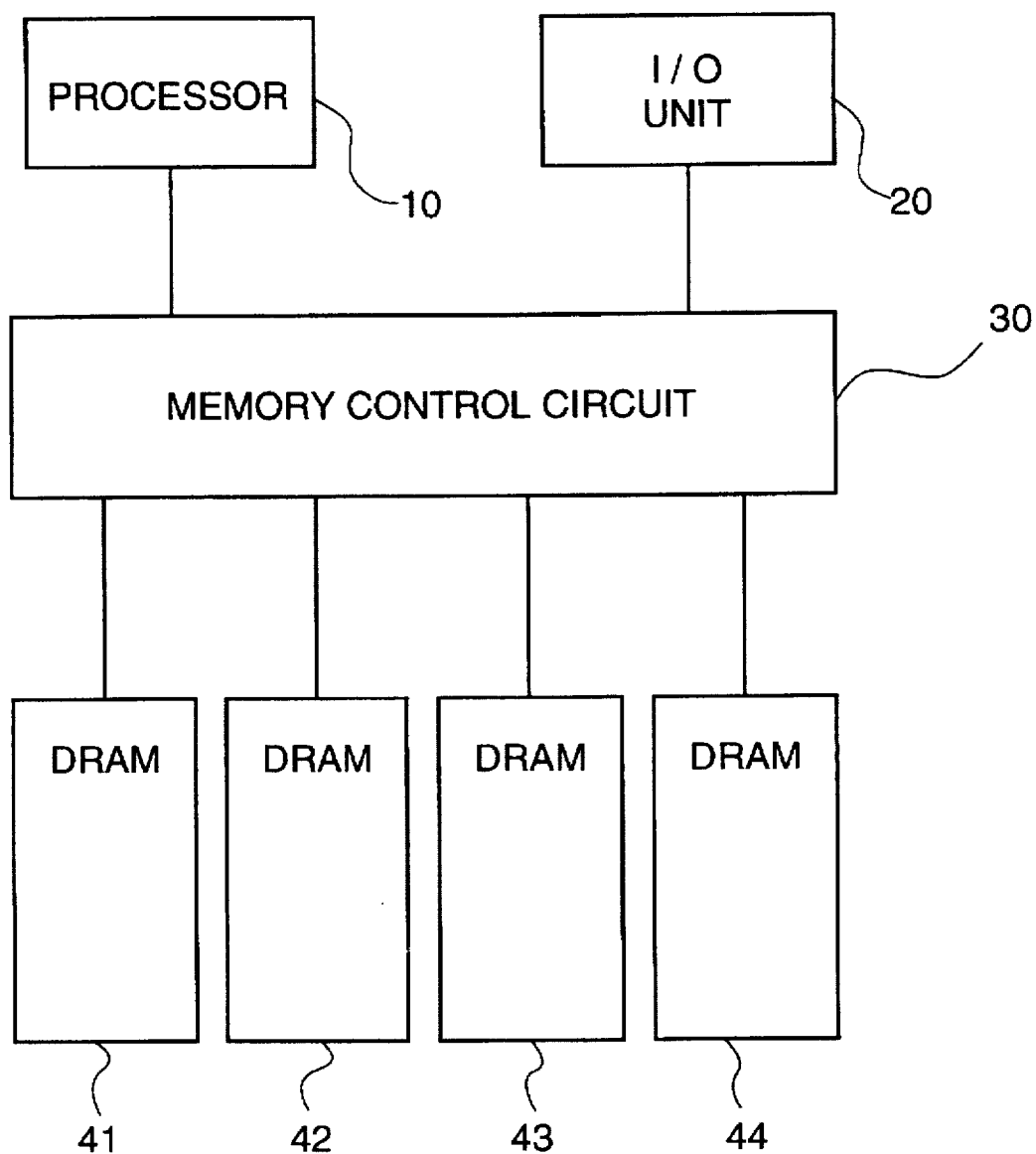
FIG. 1 is a block diagram illustrating a computer system having interleaved memory, to which the present invention broadly applies.

As shown in FIG. 1, a computer system with interleaved memory is comprised of one or more processors 10, one or more input/output units 20, a single memory control circuit chip, e.g. single LSI CMOS chip, 70 of FIG. 3, and an interleaved memory composed of four banks 41, 42, 43, 44, each bank being composed of a single chip DRAM, e.g. CMOS LSI. The four banks 41, 42, 43, 44 are mapped as a single memory module of addresses. For example, if a memory access interval in which a memory access request can be fulfilled for a bank is four cycles, each bank can be accessed at most only at intervals of 4-cycles. However, for a series of read accesses to addresses of different banks 41, 42, 43, 44, data is pipelined on a single-cycle basis (i.e. the memory is interleaved so that the banks are operated at a fraction of a memory access interval apart), thereby enhancing a throughput to four times as large as that of a single-bank constitution without interleaving for the example.

Referring to FIG. 3, memory access requests from the processor 10 and/or the input/output unit 20 are first entered in a request priority control circuit 50 in the memory control circuit 70. In the request priority control circuit 50, the memory access requests are each arranged into a unit of one request per one cycle. Then, each of the memory access requests is sent to latch 95, which temporarily holds the memory access requests in order.

Subsequently, the request queue control circuit 65 checks the four busy counter registers 751 to see whether corresponding banks 41–44 are busy or not. One counter register 751 and subtracter ALU 752 is within each of the identical counters 750, 760, 770, 780, each counter being associated with, i.e. dedicated to, a respective one of the banks 41, 42, 43, 44. The request queue control circuit 65 also checks validity bits 81, 82, 83 that hold an indication of a full or empty state of respective queue entries 71, 72, 73. In accordance with the results of these checks, the request queue control circuit 65 will send the memory access request held in the latch 95 to the single queue (having entries 71, 72, 73) that is common to all the banks 41–44. The request queue control circuit 65 selects beforehand a queue entry to be written in a next cycle, from among the queue entries whose validity bit is 0, by means of a priority circuit PRIO 85. If all validity bits are 1, indicating there is no empty queue, the request queue control circuit 65 issues an access request suppression signal to the processor 10 and the input/output unit 20, to suppress issuance of another memory access request.

A bypass circuit 80, a direct line between multiplexers 86, directly transfers a memory access request to a bank from latch 95 to latch 97 without writing the request to the queue entries 71, 72, 73.

The known technique of FIG. 2 requires one queue for each of the four banks, each queue having two entries (a total of eight entries). With the present invention, only one 3-entry queue is provided in common for all four banks (a total of three entries), the single queue being independent of the banks as shown in FIG. 3. As will be described, the three entries 71, 72, 73 permit a 4-cycle bank busy wait. Namely, according to the present invention, the number of entries is reduced by a half or more, thereby making it easy to accommodate the entire memory control circuit on a single LSI. As a result, a length of wiring for data transfer is shortened, which in turn shortens a turnaround delay in the data transfer. The scale advantages become even greater with a larger number of banks as in a super computer system.

Operations of the interleaved memory control circuit will be described.

(1) It is supposed that a read memory access request is issued by processor 10 to address 00 of bank 41 at a first cycle C1, FIG. 7. The request queue control circuit 65 checks whether the bank 41 is in use or not as indicated by the busy counter 751. If the requested bank (bank requested in a memory access request in latch 95) is found to be in use in cycle C2, the control circuit performs write-to-queue control in C3.

(2) When a memory access request is for bank 42 and the bank 42 is not in use AND there are no other memory access requests in queue to bank 42 in C8, the request queue control circuit 65 controls a write pointer 75 and a read pointer 76 to select bypass line 80 between the multiplexers 86, so that bypass control is performed to directly issue a memory access request from latch 95 to the requested bank 41 through latch 97 and through bypass 80 in C9. As a result, write-to-queue control and read-from-queue control become unnecessary, thereby shortening a time for accessing the bank memories.

(3) When the requested bank 41 is in use for a first memory access request to address 0, the request queue control circuit 65 checks the entries 71, 72, 73 of the queue to see whether any entry is empty; this checking is accomplished through the priority circuit 85 detecting validity bits 81, 82, 83. If any of the queue entries 71, 72, 73 is found to be empty, the request queue control circuit 65 performs write-to-queue control C2–C3 to write the memory access request from latch 95 to an empty entry as indicated by the write pointer R 75. If a value of the write pointer 75 is 0 for a memory access request to address 0 at C2, C3, the memory access request is written to the entry 71 at C5 and then the write pointer sets the validity bit 81 to 1. Then, read-from-queue control is performed at C5 when a value from subtracter ALU 752 is 0 indicating that the counter 751 initial value has decremented to 0. That is, the request queue control circuit 65 reads the entry 71 indicated by a read pointer R 76 (set to 0) and thereby issues the memory access request from entry 71 through the latch 97 at C6 to the bank 41. In reading the entry 71, the validity bit 81 is reset to 0. As a result, the validity bits 81, 82, 83 are all set to 0s, indicating that the queue has been emptied.

(4) Then, after the bank 41 has been accessed at address 0, memory read operations are issued from processor 10 and/or I/O unit 20, e.g. starting at C20, and consecutively sent by circuit 50 to latch 95 on successive cycles, with the requests being for address 4, address 8, and address 12. Since the bank 41 is not in use, bypass control is performed on the read operation to address 4 C21, C22 by setting the two bits of write and read pointers 75, 76 to 11, for the selection of bypass line 80. As a result of the memory read operation to address 4, the value of the write pointer 75 is set to 00 indicating the queue entry 71. For the subsequent memory access request to address 8 issued by the processor 10 during the memory read operation to address 4 of bank 41, the value of the write pointer 75 changes from 00 to 01 at C23 for indicating the queue entry 72 for the next write-to-queue control for the memory access request to address 8. After the memory access request to address 8 is written to the queue entry 71, the write pointer 75 is changed from 01 to 10 indicating the queue entry 72 so that the access request to address 12 is written to the queue entry 72, because the bank 41 is still in use by the memory read operation to address 4. When the memory access request to address 4 is issued to the memory bank 41 (i.e. read latch 97), the busy counter 751 is set to an initial value other then 0 (preferable the worst case number of cycles nC, four in the example to perform a memory read for bank 41 wherein n is a positive integer, four in the example), thereby putting the memory read operation to address 8 and the memory read operation to address 12 in a wait state in queue. That the queue 73 is empty is reported to the request queue control circuit 65 by the priority circuit 85 that has detected the valid bit 83 being 0.

(5) On the other hand, if all of the queue entries are found to be full, the request queue control circuit 65 issues an access request suppression signal to the processor 10 and the input/output unit 20 on a line 91 in FIG. 3. A memory access request, issued by the processor 10 or input/output unit 20 immediately before the issuance of the access request suppression signal, is held in the latch 95, waiting for an empty queue entry. Then, when any of the queue entries 71, 72 and 73 is emptied, the access request suppress signal is turned off for one cycle to accept the next memory access request into the empty queue entry. Alternatively, if the next memory access request is for a bank not in use and not requested by a memory access request in queue, the suppression signal is turned off for one cycle to accept the next memory access request directly to the requested bank so that the bank memory can be accessed by bypass control.

(6) When the queue entry 73 is empty, 1-cycle interval write to queue for the next access request to bank 41.

In order to set a value of read pointer R 76 (a register) for controlling a selecting circuit 86 (a multiplexer, MUX in FIG. 3), the access sequence assurance circuit 90 (shown in detail in FIG. 4) is composed of bank corresponding circuits 850, 860, 870, 880 (which are identical to each other so that only one is shown in detail) a DEC, OR gate 102 and queue entry corresponding circuits 810, 820, 830 (which are identical to each other so that only one is shown in detail). At the time of write control, an entry number is input from the priority circuit 85 and a bank address of a memory access request is input from the latch 95. At the time of read control, a bank corresponding read signal is input from the circuit 750 consisting of the bank busy counter 751 and the subtracter ALU 752.

A bank corresponding circuit 850 holds in its holding circuit an entry number 852 of a least recent access request for a bank controlled by the bank corresponding circuit 850. Also the bank corresponding circuit 850 holds a validity bit 851 in a validity bit circuit, the validity bit 851 indicating whether the entry number 852 is valid or not. Further, in order to update the above-mentioned entry number 852 at the time of entry writing, the bank corresponding circuit 850 holds an entry number 854 of the most recent access request and a validity bit 853 of the entry number 854. In order to update the entry number 852 at the time of entry reading, the queue entry corresponding circuit 810 holds an entry number 812 of a next least recent access request and a validity bit 811 of the entry number 812.

From access requests controlled by the queue entry corresponding circuits 810, 820, 830 in an order in which the access requests have been written in the entry queue in a chain, the bank corresponding circuits 850, 860, 870, 880 independently know an access request to be read from queue earliest for each bank and an entry number of a queue entry to be read next. An AND gate 100 with three inputs of the entry number 852, an output of the validity bit circuit 851 and a read activating signal from the bank busy counter 752, generates an output 101 of an entry to be read from queue at the time bank busy is cleared. All of the outputs of the AND gates 100 are input to an OR gate 102 to generate an entry number in line 103 to be sent to read pointer 86 to select the entry to be read, and to the corresponding validity bit 81–83 to increment the same.

Figure 4:
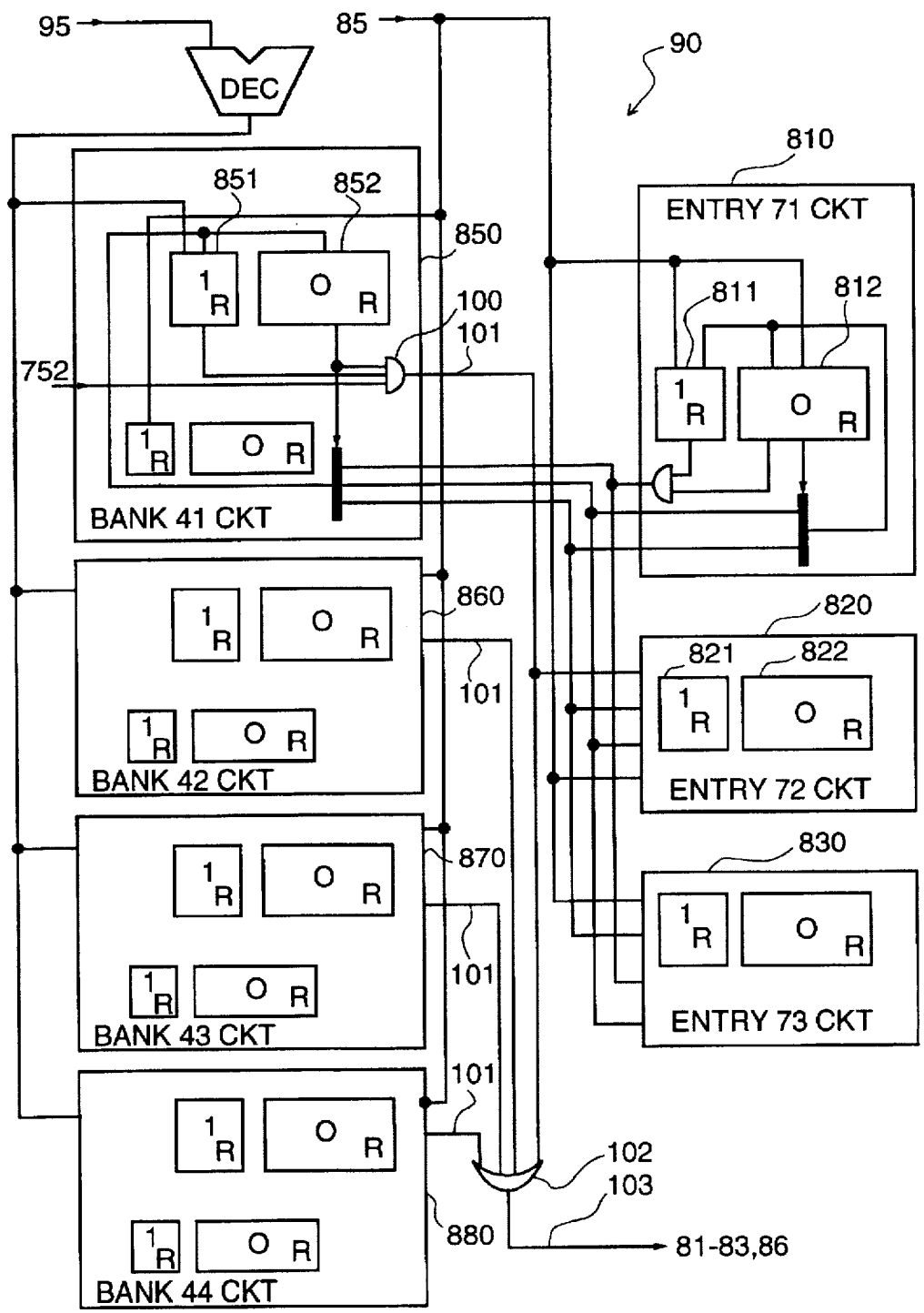
FIG. 4 is a block diagram illustrating the access sequence assurance circuit of FIG. 3.

Now, operations of the access sequence assurance circuit 90 of FIG. 4 will be described in detail (from (4') to (6')) with reference to FIG. 7.

(4') It is supposed that with the bank 41 not in use at C20, read operations to address 4, address 8 and address 12 (addresses 4, 8, 12 are for bank 41) have been consecutively issued by processor/s 10 and/or input/output unit/s 20 and consecutively placed in latch 95 at C20, C21, C22. Since the bank 41 is not in use at C21, bypass control is performed on the read memory access request to address 4 through the bypass line 80 (write pointer at 11, binary) at C21, C22. The write pointer 75 is then set to 00. Then, when the read memory access request to address 8 has been stored in entry 71 of the queue at C23 according to the write pointer holding 00, the write pointer 75 changes from 00 to 01. When the read memory access request to address 12 has been stored in entry 72 of the queue at C22, the write pointer 75 changes from 01 to 10, binary. Meanwhile, the read pointer 76 remains set to 11 after C20 (indicating the bypass 80) because of the bypass control. This bypass control sets the busy counter 751 to a value (e.g. nC or n cycles) other than 0 at C21, thereby putting the read operation to address 8 and the read operation to address 12 in a wait state for n cycles until C21+n. In addition, the priority circuit 85, which has detected the validity bit 83 being 0, reports to the access sequence assurance circuit 90 that the queue entry 73 is empty.

Meanwhile, a write entry number in write pointer 75, coming from the priority circuit 85, changes from 10 to 00 at C21 and at C23 from 00 to 01. Since at the time of C20 the queue has no memory access request to the bank 41 (values of 81 to 83=0), the first memory access request (to address 4) is passed through the bypass 80, C20, C21. On the other hand, the write operations to queue entries 71 and 72 take place for the memory access requests to address 8 and address 12 at C22 and C23, respectively.

At the first write-to-queue operation at C22 (writing the memory access request for address 8 to the queue entry 71), the entry number 854 of a most recent access request and the entry number 812 of a least recent access request are set to 0 and the validity bit 811 of the entry number 812 of a next least recent access request of entry 0 is initialized to 0. At the second write-to-queue operation at C23 (writing the memory access request for address 12 to the queue entry 72), the entry number 854 is set to 1 and the validity bit 821 of the entry number 822 of a next least recent access request of entry 1 is initialized to 0. At the second write-to-queue operation at C23, because the validity bit 851 is valid (1), the entry number 812 of a next least recent access request of entry 0 indicated by the entry number 852 is set to 0, to indicate the entry 1.

(5') Then, when the access to address 4 has been terminated at C21+n to take the bank 41 out of the busy state (as indicated by counter register 751 and ALU 752, the value 0 of is used for reading, and value 1 of the entry number 812 is set to the entry number 852 to indicate the entry 1. Value 0 is set to the validity bit 811 to indicate an invalid state. Consequently, the memory access request to address 8 is read at C21+n and access is made to address 8 for the next n cycles, putting the bank 41 in busy state again by setting counter register 751 to an initial value.

(6') When the access to address 8 has been terminated at C21+n to take the bank 41 out of the busy state, value 1 of the entry number 852 is used for reading, and value 0 is set to the entry number 852 to indicate the invalid state. Subsequently, the memory access request to address 12 is read-from-queue and the memory access to address 12 is performed.

From an output operation of the processor 10 to an output operation of the latch 97 to access bank 41, six machine cycles are required in the known art as shown in FIG. 5, vs. at most five machine cycles for the present invention.

Figure 6:
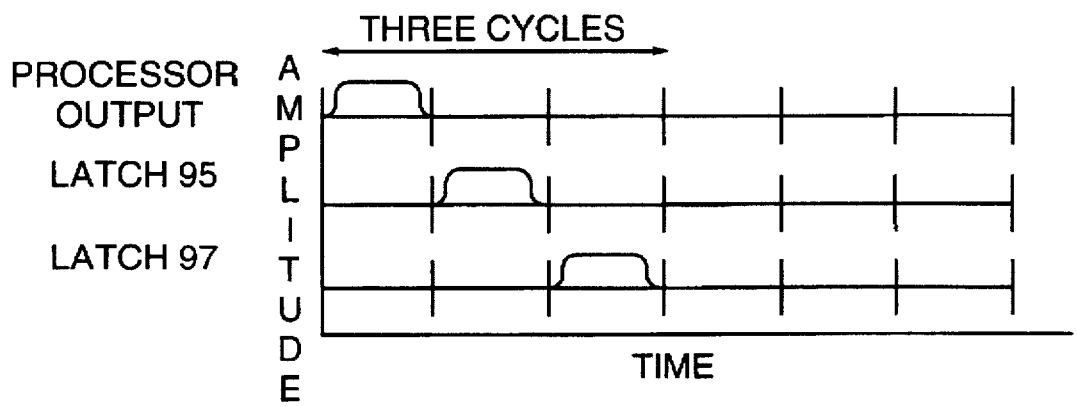

Referring to FIG. 6, there is shown a timing chart of the bypass operation of the memory control circuit of FIG. 3. From an output operation of the processor 10 to an operation of the bank activating latch 97, three machine cycles are required. One cycle is saved by eliminating the LSI relay latch 96 (of FIG. 2) by using a single random entry access queue. Two cycles are saved by eliminating read-from-queue and write-to-queue operations by provision of the bypass. FIG. 7 shows the present invention timing with control other than the bypass control taking at most five cycles.

Consequently, saving of the three machine cycles in the present memory access bypass control in comparison to FIG. 5 realizes a high-speed data transfer between interleaved memory and the processor 10 or the input/output unit 20. In addition, the number of queue entries can be reduced to about 1/16 of prior controls by the use of bank busy control based on a random access queue, resulting in a significant reduction in LSI cost. To be specific, if a four-entry queue is provided for each bank for the known art interleaved memory system having 16 banks, then 12 bytes×64 (4 entries×16 banks)=768 bytes are necessary for both address and data. If four entries are provided according to the present invention in common for all of the banks, then only 12 bytes×4 (4 entries)=48 bytes are necessary for both address and data (a reduction to 48/768=1/16). In addition, high-speed processing is promoted by integrating the bank busy control circuit of all banks as a part of the memory control circuit onto a single LSI to reduce the number of times the control signals pass between LSIs.

Thus, according to the present invention, the circuit scale of bank busy control can be reduced by half or more as compared to the prior art as exemplified by FIG. 2 while assuring an access sequence in a parallel computer system having interleaved memory, thereby facilitating large scale integration of the bank busy control circuits. Given the circuit scale of the present invention remaining unchanged from that of FIG. 2, the number of entries per bank can be increased over that of FIG. 2 with the present invention when memory request accesses concentrate on a particular bank, thereby enhancing memory control speed.

The number of queue entries of bank busy wait access request necessary for interleaved memory control can be reduced to about 1/16 of the known art exemplified by FIG. 2, to integrate the memory control circuits on a single LSI, resulting in a shortened turnabout time. Further, the provision of the bypass 80 and the selecting circuits MUX reduces the write-to-queue and read-from-queue time, thereby shortening the turnabout time of memory access for the interleaved memory system and therefore enhancing program execution speed.

The embodiment uses four banks 41, 42, 43, 44, for example. If the present invention is applied to a computer system in which memory a access interval by the processor 10 is shortened by half (e.g. to two cycles) and the number of banks is increased by two or more, for example, a higher gate reducing effect can be obtained.

More broadly, the bypass 80 and circuits to control the same could be employed in each memory control circuit 710, 720, 730, 740 of FIG. 2, or in similar environments. The memory control circuit 70 could be used in basic principle to distribute tasks that are addressed to different processors (instead of different banks) or among addressed different I/O's (instead of different banks).

While a preferred embodiment of the present invention has been described in detail, with variations and modifications, further embodiments, variations and modifications are contemplated within the broader aspects of the present invention, in addition to the advantageous details, in accordance with the spirit and scope of the following claims.

I claim:

1. A memory control circuit comprising:

means for receiving access requests entered from outside said memory control circuit and issued to an interleaved memory having a plurality of banks;

a single access queue connected to said means and storing the access requests commonly for said plurality of banks; and means controlling said access queue for storing the access requests while waiting for said plurality of banks to be taken out of a wait state;

an access sequencing circuit reading the access requests from said access queue and assuring access sequence of the access requests;

a circuit for detecting that a first bank identified by a first access request in said means for receiving is idle;

a circuit for detecting that said access queue contains no access request addressed to said first bank; and a bypass responsive to when said first bank is idle and when said access queue contains no access request addressed to said first bank, to transfer the first access request from said means for receiving to said first bank without passing the first access request through said access queue.

2. A memory control circuit as defined in claim 1, wherein said access queue has random access entries.

3. A memory control circuit as defined in claim 2, further comprising:

an access sequencing circuit reading the access requests from said access queue and assuring access sequence of the access requests.

4. A computer system, comprising:

an interleaved memory;

a device for issuing memory access requests, each with a requested bank address, to the interleaved memory;

said interleaved memory having a plurality of banks of memory to which the memory access requests are addressed;

a priority control circuit having a latch receiving and latching in the memory access requests at a controlled timing in an order of their receipt;

a queue control circuit reading the requested bank address of the memory access requests and generating control signals;

a separate bank busy counter dedicated to each of said banks and coupled to said queue control circuit;

a single random access queue having a plurality of random access entries, each of said entries being commonly coupled between said latch and each of said memory banks;

said priority control circuit, said queue control circuit, said latch, said bank busy counters, and said random access queue being integrated on a single LSI chip as a memory control circuit;

said memory control circuit controlling transfer of each of the memory access requests to a bank corresponding to the requested bank address and in response thereto starting a fixed time interval busy count in the bank busy counter dedicated to the bank corresponding to the requested bank address, placing further memory access requests to the bank corresponding to the requested bank address in a wait state during the busy count, and releasing a next one of the memory access requests to the bank corresponding to the requested address bank from the wait state at expiration of the busy count.

5. A computer system according to claim 4, wherein each of said bank busy counters includes a register receiving the busy count and a decrementing ALU connected to decrement the busy count.

6. A computer system according to claim 4, further including an input selecting circuit between said latch and said random access queue, and being address selected by said queue control circuit for transferring a memory access request from said latch randomly into one of said random access entries of said random access queue.

7. A computer system according to claim 4, further including an output selecting circuit being address selected to randomly select one of said random access entries for transferring a corresponding one of said memory access requests to one of said plurality of banks.

8. A computer system according to claim 4, further including an output latch operatively connected between said random access queue and said plurality of banks, for transferring the memory access requests from said random access queue to said plurality of banks.

9. A computer system according to claim 4, wherein said memory control circuit further has a separate validity bit register dedicated to each of said random access entries of said random access queue, and said queue control circuit setting and resetting validity bits in said validity bit registers in accordance with whether or not said random access entries in said random access queue are empty.

10. A computer system according to claim 4, wherein said memory control circuit has a write control register and a read control register, respectively holding entry addresses for writing and reading said random access entries of said random access queue.

11. A computer system according to claim 4, wherein said memory control circuit includes a bypass line bypassing said random access entries of said random access queue for transferring the memory access requests to said plurality of banks without a write-to-queue control and without a read-to-queue control, and in response to a bypass control from said queue control circuit; and said queue control circuit providing the bypass control in response to determining that one of the memory access requests in said latch requests one of said plurality of banks that is not busy as indicated by expiration of the busy count of one of said bank dedicated to said one of said plurality of banks AND absence of any of the memory access requests in said random access busy counters queue requesting said one of said plurality of banks.

12. A computer system according to claim 4, wherein said memory control circuit further includes a sequence assurance circuit, for assuring that a sequence of the memory access requests received for each of said plurality of banks is the same sequence as a sequence of the memory access requests transferred from said memory control circuit to each of said plurality of banks.

13. A computer system according to claim 12, wherein said sequence assurance circuit reads the memory access requests from said random access queue separately for each of said plurality of banks and keeps the access sequence separately for each of said plurality of banks.

14. A computer system according to claim 13, wherein said sequence assurance circuit includes a separate bank corresponding circuit dedicated to each of said plurality of banks for storing an indication of one or more of the memory access requests being held in said latch or said random access queue and that request the corresponding each of said plurality of banks.

15. A computer system according to claim 14, wherein each of said bank corresponding circuits consist of validity bit registers, indicator registers and logic gates.

16. A computer system according to claim 4, wherein said queue control circuit detects when all of said random access entries of said random access queue are full, holds one or more of the memory access requests in a wait state in said random access queue and issues an access request suppression signal to said device indicating that further memory access requests from the device will not be received by said memory control circuit.

17. A computer system according to claim 4, wherein said busy count is at least equal to a worst case cycle time required for a memory access interval for said plurality of banks.

18. A computer system according to claim 13, wherein each of said plurality of banks is a single chip DRAM LSI CMOS.

19. A computer system according to claim 18, wherein said busy count is at least equal to a worst case cycle time required for a memory access interval for said plurality of banks.

20. A computer system according to claim 18, further including an output latch operatively connected between said random access queue and said plurality of banks, for transferring the memory access requests from said random access queue to said plurality of banks;

further including an output selecting circuit being address selected to randomly select one of said random access entries for transferring a corresponding one of said memory access requests to one of said plurality of banks; and further including an input selecting circuit between said latch and said random access queue, and being address selected by said queue control circuit for transferring a memory access request from said latch randomly into one of said random access entries of said random access queue.

21. A computer system according to claim 18, wherein said memory control circuit has a write control register and a read control register, respectively holding entry addresses for writing and reading said random access entries of said random access queue;

wherein said memory control circuit includes a bypass line bypassing said random access entries of said random access queue for transferring the memory access requests to said plurality of banks without a write-to-queue control and without a read-to-queue control, and in response to a bypass control from said queue control circuit; and said queue control circuit providing the bypass control in response to determining that one of the memory access requests in said latch requests one of said plurality of banks that is not busy as indicated by expiration of the busy count of one of said bank dedicated to said one of said plurality of banks AND absence of any of the memory access requests in said random access busy counters queue requesting said one of said plurality of banks; and wherein said memory control circuit further includes a sequence assurance circuit, for assuring that a sequence of the memory access requests received for each of said plurality of banks is the same sequence as a sequence of the memory access requests transferred from said memory control circuit to each of said plurality of banks.

22. A computer system according to claim 21, wherein said sequence assurance circuit reads the memory access requests from said random access queue separately for each of said plurality of banks and keeps the access sequence separately for each of said plurity of banks.

23. A computer system according to claim 22, wherein said sequence assurance circuit includes a separate bank corresponding circuit dedicated to each of said plurality of banks for storing an indication of one or more of the memory access requests being held in said latch or said random access queue and that request the corresponding each of said plurality of banks.

24. A computer system according to claim 23, wherein each of said bank corresponding circuits consist of validity bit registers, indicator registers and logic gates.

25. A computer system, comprising:

a memory;

a processor issuing memory access requests, each with a requested bank address, to the memory;

said memory having a plurality of banks of memory to which the memory access requests are addressed;

a priority control circuit receiving and latching the memory access requests at a controlled timing in an order of receipt, and including a latch receiving and storing the memory access requests during the latching;

a queue control circuit reading the requested bank address of the memory access requests and generating control signals; and a queue having a plurality of entries coupled between said latch and at least two of said memory banks of memory.

26. A computer system according to claim 25, further including said priority control circuit, said queue control circuit, said latch, and said queue being integrated on a single LSI chip as a memory control circuit;

said memory control circuit controlling transfer of a memory access request from said latch through said queue to a bank identified by the requested bank address;

wherein said memory control circuit includes a bypass line bypassing said queue for transferring memory access requests without a write-to-queue control and a read-to-queue control, in response to bypass control from said queue control circuit; and said queue control circuit providing the bypass control in response to determining that a memory access request in said latch requests one of said plurality of banks that is not busy AND absence of any memory access requests in said queue requesting said one of said plurality of banks.

27. A computer system according to claim 26, wherein each of said plurality of banks is a single chip DRAM LSI CMOS.

28. A computer system according to claim 25, wherein each of said plurality of banks is a single chip DRAM LSI CMOS.

* * * * *